Patented Dec. 27, 1932

1,892,342

UNITED STATES PATENT OFFICE

ALBRECHT HASELBACH, OF NAMSLAU, GERMANY

PROCESS FOR THE PREPARATION OF BEERS WEAK IN ALCOHOL

No Drawing. Application filed May 28, 1930, Serial No. 456,799, and in Germany May 28, 1929.

In the preparation of beers weak in alcohol the object in view is to obtain a beer which, in spite of its poorness in alcohol, retains the taste and the nutritive value of normal full beer. These desired qualities depend on the quantity of malt extract which remains after fermentation. Above all, it is desirable to retain the bitter flavor of the hops.

In the normal manufacture of beer there is a definite proportion (about 3 to 1) between the original wort contents and the alcohol contents. In order to obtain the above described object, various deviations from the normal working process have been proposed without having attained satisfactory results in the matter of taste and innocuousness. If the natural fermentation is artificially interrupted as soon as the desired alcoholic content is obtained, there remains the unmatured flavor of the new beer, the removal of which has not been attained. Also the removal of the yeast at this stage by filtration or centrifuging does not prevent the loss of the fine aromatic tasting materials which are only formed by long contact, normal fermentation, and storage. The process of distilling out the alcohol from the matured finished beer necessitates the use of a vacuum and the process is thereby rendered not only costly but the carbonic acid and valuable flavoring materials are lost as is the case with the product known in North America under the name of "near beer". On the other hand in the brewing of less fermentable dark malt (especially caramel malt) with the subsequent addition of sugar, and prevention of further fermentation by pasteurizing, as is often carried on in North Germany, a dark beer is obtained with a flavor which is undesirably sweet from the point of view of the consumer, due to this caramel malt and this excessive sweet taste covering the flavor of the hops.

It has also been attempted to obtain beer poor in alcohol by subjecting the mash to a lactac acid fermentation sufficient to mask the malt sugar flavor by the acid formed, then to stop this fermentation by the addition of hops and then to subject the product to a quite short alcoholic fermentation. A beer of this kind, however, shows always all the drawbacks of an immature beer as the desired alcoholic content is obtained after 2 to 3 days by the artificial interruption of the alcoholic fermentation. By the acidification masking of the malt sugar flavor is obtained to a certain extent, but the ripe, well matured flavor is never obtained.

According to the present invention, however, the usual light colored barley malt is used for the wort with sufficiently strong addition of hops to the wort to obtain an appreciably smaller alcoholic content on normal alcoholic fermentation and storage. In this way it is possible to obtain a light colored beer of a fine bitter taste with the same proportion of extract as a matured full beer though with a much smaller alcoholic content, and without undesired acid.

The concentration of the wort for the preparation can be chosen so that the finished beer, after the conclusion of fermentation and storage, shows residual contents of extract the same as those of a full beer, and the process is therefore advantageously carried out in such a way that only one half of the usual amount of malt is present in the wort, while the addition of hops amounts to the full quantity used in the usual wort. In this way there is produced a flavor which is very close to that of the usual full beer, as, in the finished beer, the proportion of the remaining unfermented extract has a very similar relation to the bitter materials of the hops as in the case of normal beer. In other word, there is therefore, obtained a simple beer which, in its finished condition, shows a similar composition to a full beer, with the difference that it has an appreciably smaller content of alcohol.

In order still further to increase the nutritious value of this beer, a beer so obtained can, shortly before bottling, be treated with the addition of sugar to bring the original wort content to from about 11 to 14%, and then pasteurized. In this way a full beer is obtained with a lower alcoholic content and yet with an appreciably higher nutritive value than a normal beer. By the choice of a suitable sugar and correct proportions, the bitter taste of the beer is always appreciably prominent. The alcohol content of the so-obtained beer does not show the usual proportion of about ⅓ of the original wort content but is appreciably smaller. For example, if a wort is used with ½ of the usual proportion of malt the content in alcohol is about ⅕ of the content of the original wort. There is obtained a proportion of extract to alcohol with the unsugared beer thus obtained of from 3.5 to 1.3 in contrast to the proportions of from 3.9 to 3.7 for a normal beer.

This is to be attributed to the fact that by the agency of the hops, colloid chemical alterations are caused in the wort which bring about diminution in the fermenting power of the yeast. These phenomena which inhibit fermentation are utilized by an unusually large addition of hops, but it is to be noted that on account of other actions the yeast gradually attains an adaptation and an immunity from effect, so that after a certain time a change of the kind of yeast used should be made and one from a wort containing a small amount of hops (e. g. caramel wort) should be used. Top-fermenting (swimming) yeast has the best adaptation for the new process.

A further improvement of the new process consists in using for the addition of sugar a fluid starch sugar, known as corn syrup. The use of solid starch sugar for strengthening beer is known, but this and other possible methods of sweetening are not satisfactory for the preparation of the new beer as, in combination with the strong high content of hops, they give a disagreeable mixed flavor of sweet and bitter. The fluid corn syrup on the other hand, which is obtained, like the solid starch sugar, by the action of acids on starch, gives, on the one hand, no disturbing excessive sweetness and, on the other hand, does not give the sharply sweet taste which can be separated from the bitter taste as does the solid starch sugar and the other kinds of sugar. Moreover its use gives a full and fine beer, in which the sweet taste and the bitter taste are completely blended. This depends partly on the fact that the fluid starch sugar contains a higher proportion of dextrin to the glucose than does the solid starch sugar, and on account of this composition, which approaches closely to that of the malt wort, it shows no excessive sweetness which opposes with the bitter taste. Furthermore the fluid corn syrup has a purer and better taste than the commercially obtainable solid starch sugar.

The following examples illustrate the new process more closely:

*Example 1*

A simple beer with a low alcohol content and the same extract content as a normal beer is obtained by boiling an original wort of about 6% concentration with the addition of about 2 lbs. of hops per cwt. instead of the usual 1 lb. per cwt. of mashed malt. After a complete fermentation of normal duration and storage that is, about one week and four to six weeks respectively, a fine bitter tasting beer is obtained, the extract content of which is very similar to that of a usual beer, being about 3.5%, and the alcohol content being only about from 1.1 to 1.3%.

This beer is then diluted by water in such degree, that a beer is obtained having a content of alcohol less than 0.5% or the like, according to the laws.

Otherwise such a beer can be obtained immediately by employing an original wort of about 2.5% concentration and 2 lbs. of hops per cwt. of mashed malt.

*Example 2*

A beer weak in alcohol having from 9 to 12% of the original wort is obtained by treating beer obtained according to Example 1, shortly before bottling, with about 11 litres of 57% sugar solution for each 100 litres of the beer, or better still with the corresponding quantity of corn syrup. The sweetened beer is then pasteurized, filtered, and gives then a beer with an extract content exceeding 8% and an alcohol content less than 0.5%.

The taste of the beer made according to Example 1 with regard to bitterness and the general flavor is that of a normal beer.

The taste of the beer made according to Example 2 resembles more that of a light bitter sweet strong beer although its extract content may exceed that of the latter.

With these beers the range of use is greatly improved on account of its smaller alcohol content so that these beers can be used in special cases where ordinary beers would be harmful, for example the new beers could be used both in very hot weather and when strong physical exercise is being undertaken, as for example in sports, without risk of bad effects.

I claim:

1. Process for the preparation of beer poor in alcohol, consisting in preparing the original wort with an addition of hops of about 2 lbs. per cwt. of mashed malt and using a top-fermenting yeast normally employed for wort containing 1 lb. of hops per cwt. of malt and fermenting and storing for about 1 week and 4 to 6 weeks respectively.

2. Process for the preparation of beer poor in alcohol, consisting in preparing an original wort of only about half the malt content necessary for attaining the desired extract content, using the full quantity of hops corresponding to said extract content and a top-fermenting yeast, and after the completion of fermentation, increasing the quantity of extract to the full desired degree by the addition of sugar.

3. Process for the preparation of beer poor in alcohol as claimed in claim 2, wherein corn syrup is used for the subsequent sugaring.

In witness whereof I affix my signature.

ALBRECHT HASELBACH.